United States Patent [19]

Shiratori et al.

[11] 4,192,529
[45] Mar. 11, 1980

[54] STABILIZER MOUNTING MEANS

[75] Inventors: Harunori Shiratori; Kenichi Kikuchi, both of Toyota, Japan

[73] Assignee: Toyota Jidosha Kogyo Kabushiki Kaisha, Toyota, Japan

[21] Appl. No.: 925,782

[22] Filed: Jul. 18, 1978

[30] Foreign Application Priority Data

Jan. 30, 1978 [JP] Japan .............................. 53-9929[U]

[51] Int. Cl.² ............................................ B60G 11/18
[52] U.S. Cl. ................................ 280/689; 267/57.1 R; 280/700
[58] Field of Search ............... 280/689, 697, 700, 715, 280/716, 717, 721; 267/21 R, 54 A, 57.1 R, 153

[56] References Cited

U.S. PATENT DOCUMENTS

| | | | |
|---|---|---|---|
| 2,723,870 | 11/1955 | Page | 280/717 |
| 2,853,325 | 9/1958 | Ward | 267/54 A |
| 3,448,994 | 6/1969 | King | 280/689 |
| 3,642,268 | 2/1972 | Hipsher | 267/57.1 R |

*Primary Examiner*—Robert R. Song
*Assistant Examiner*—John A. Carroll
*Attorney, Agent, or Firm*—Finnegan, Henderson, Farabow, Garrett & Dunner

[57] ABSTRACT

A stabilizer mounting member comprising a tubular cushion member and a bracket member, wherein the tubular cushion member has lobe portions projecting radially outwardly at its opposite axial ends, while the bracket member has corresponding recesses which receive these lobe portions, wherein the projecting height of the lobe portions is greater than the depth of the recesses so that the cushion member is more tightly gripped at its opposite axial ends than at its middle portion so as to prevent entry of mud, sand or the like between the cushion member and the stabilizer.

2 Claims, 3 Drawing Figures

STABILIZER MOUNTING MEANS

BACKGROUND OF THE INVENTION

The present invention relates to a stabilizer incorporated in the suspension system of a vehicle, and more particularly to a means for mounting a stabilizer to the frame of a vehicle.

A stabilizer incorporated in the suspension system of a vehicle is generally a sort of torsion bar element formed of a rod member which is bent into a U-shape or staple-like shape. The stabilizer is mounted to the frame of the vehicle by means of a mounting means which comprises a generally tubular cushion member made of a rubber material and having a through bore or hole for receiving the straight central portion of the stabilizer, and a bracket member having a U-shaped strap portion and mounting flange portions provided at its opposite sides, and which is adapted to be fixed to the frame of the vehicle, for example by bolts, with said tubular cushion member being straddled and gripped by said U-shaped strap portion. The stabilizer is further fixedly attached to the right and left lower control arms of the vehicle suspension at its opposite ends, and serves to provide a force tending to equalize the heights of the lower control arms and thus tending to prevent excessive rolling of the vehicle. Insertion of such a tubular cushion member or rubber bushing in the mounting of the stabilizer to the frame with a bracket member as stated above, adds softness to the action of the stabilizer and is essential for providing the desirable soft ride. However, since such a stabilizer attachment means is usually fixed to the exposed part of the vehicle which is, during driving, exposed to dirt and material such as mud, sand or the like, it suffers from the problem that contaminants may enter between the inner surface of the through bore formed in the tubular cushion member and the outer surface of the main straight portion of the stabilizer thereby undesirably causing the mating portions thereof to wear out prematurely. Furthermore, while such wear or abrasion does not greatly reduce the safety of a vehicle employing a conventional suspension system wherein control strut bars are connected between the lower control arms and the frame to ensure the operational stability of the arms, it can cause serious safety problems in a vehicle employing a suspension system wherein the stabilizer is connected to the lower control arms which are not provided with control strut bars, and is adapted to serve as both stabilizer and control strut bars. Although one solution to the above-mentioned problem is to increase the fastening load applied to the tubular cushion member by the bracket member so as to prevent the entry of the contaminants, increase in the fastening load may induce the problem that the elasticity inherent to the cushion member is adversely affected, resulting in an uncomfortably hard ride.

SUMMARY OF THE INVENTION

The present invention contemplates to solve the above-mentioned problems encountered in stabilizer mounting means. The object of the present invention is to provide a stabilizer mounting means which is improved so as to provide maximum protection against wear in the mating portions of the tubular cushion member and the rod member of the stabilizer caused by the entry of mud, sand or the like therebetween while ensuring a soft ride.

In order to accomplish the above-mentioned object, the present invention proposes to construct a stabilizer mounting means of the aforementioned type which comprises a tubular cushion member made of rubber and a bracket member for fastening the cushion member around the main straight portion of the stabilizer rod, in such a structure that the tubular cushion member is fastened more tightly at its opposite axial end portions than at its intermediate portion. This arrangement effectively prevents the entry of mud, sand or the like therebetween while sufficiently preserving the elasticity of the cushion member. In more detail, the present invention contemplates to accomplish this improved fastening by providing the cushion member with radially outwardly projecting lobe portions located adjacent its opposite axial ends on the one hand, and on the other hand the U-shaped strap portion of the bracket member with recesses which matingly receive the corresponding lobe portions, wherein the height of the lobe portions is greater than the depth of the recesses. In accordance with this arrangement of the present invention, it is also accomplished that the tubular cushion member is easily and positively positioned relative to the bracket member and that at the same time the cushion member is definitely held in place, yet the softness or elasticity of the cushion member is preserved as a whole while ensuring the desired fastening load at opposite axial ends thereof.

BRIEF DESCRIPTION OF THE DRAWINGS

The present invention will become more fully understood from the detailed description given hereinbelow and the accompanying drawings which are given by way of illustration of a preferred embodiment only and thus are not limitative of the present invention, and wherein.

DESCRIPTION OF THE PREFERRED EMBODIMENT

Figure 1:
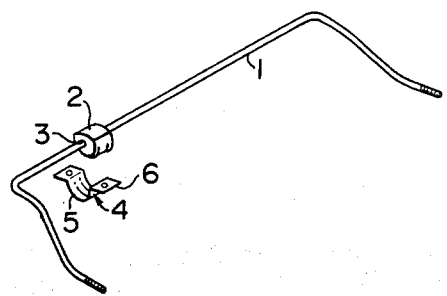
FIG. 1 is a disassembled schematic view showing a stabilizer mounting means constructed in accordance with the present invention.

Referring to the figures, 1 designates a stabilizer formed of a rod member and 2 designates a tubular cushion member made of rubber which has a through aperture or bore 3 formed therethrough for receiving the main straight portion of the stabilizer. Preferably, the bore has an internal diameter substantially no greater than the external diameter of the main straight portion so as snugly to receive the stabilizer. A bracket member 4 comprises a U-shaped strap portion 5 and mounting flanges 6 provided at opposite sides thereof, and is adapted to be fixed to the frame 7 of a vehicle (FIG. 2) by bolts, not shown, with the U-shaped strap portion straddling the cushion member and the flanges being attached to the frame.

Figure 2:
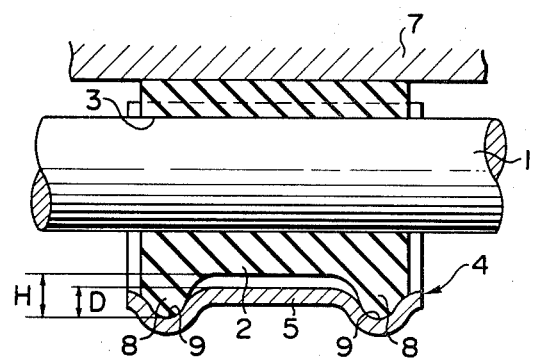
FIGS. 2 and 3 are enlarged longitudinal sectional views showing an embodiment of the present invention before and after fastening of the bracket member, respectively.

As shown in FIG. 2, the tubular cushion member 2 has end lobe portions at its opposite ends where the through bores 3 open, each lobe portion projecting radially outwardly and extending circumferentially through more than 180°. Further, the bracket member 4 has recesses 9 at opposite ends of the U-shaped strap portion 5. The recesses are longitudinally spaced from each other the same distance as the lobe portions are spaced apart, and are contoured to receive complementarily the corresponding lobe portions.

As will be apparent from FIG. 2, in the free condition wherein the bracket member is not clamped, i.e. the tubular cushion member is not gripped, the projection height H of the end lobe portions 8 is greater than the depth D of the recesses 9.

Figure 3:
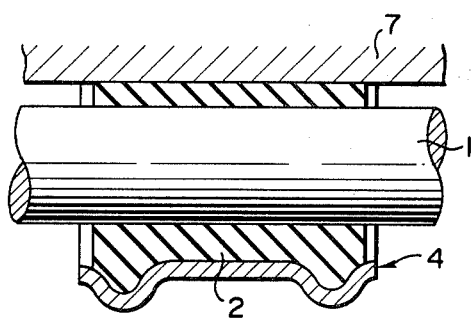

When the tubular cushion member 2 having such end lobe portions 8 is mounted on the frame 7, by the bracket 5 having the recesses 9 being clamped to the vehicle frame 7 by bolts (not shown), so that the flanges 6 abut against the vehicle frame 7, as shown in FIG. 3, the end lobe portions 8 are subject to a predetermined greater fastening pressure than the intermediate portion located therebetween as the clearance between the bracket 5 and the vehicle frame 7 is taken up, these two fastening pressures being determined by the relative dimensions of the bracket 5 and the cushion member 2, with the result that the cushion member is more firmly gripped at its opposite ends than at its central portion. Thus, it will be appreciated that contaminants or foreign material such as mud, sand or the like are effectively and positively precluded from entering between the through bore 3 and the main straight portion of the stabilizer 1 through the open ends of the bore, while, at the same time, since the cushion member is only moderately gripped over the greater part of its length excluding its opposite ends, it offers sufficient elasticity as a whole and holds the stabilizer gently enough to provide the vehicle with a comfortable soft ride. Furthermore, it will also be appreciated that since the end lobe portions 8 of the tubular cushion member and the corresponding recesses 9 in the bracket member complementarily engage with each other when the stabilizer is mounted, the cushion member is positively positioned relative to the bracket member so that an undesirable axial movement of the cushion member such as to cancel the above-explained particular clamping of the cushion member or allow the cushion member to fall out of the bracket member, is positively prevented.

Although the invention has been shown and described with respect to a preferred embodiment thereof, it should be understood by those skilled in the art that various changes and omissions of the form and detail thereof may be made therein without departing from the scope of the invention.

We claim:

1. A device for mounting a stabilizer on a vehicle frame, comprising:
   (a) a substantially tubular cushion member having an axial bore for receiving said stabilizer;
   (b) a lobe portion integral with and radially projecting from the peripheral surface of said member at each opposed axial end thereof;
   (c) a bracket member for straddling said cushion member and securing it to said frame comprising a U-shaped strap portion and a pair of flanges each having means for attaching said bracket to said frame, one of said pair of flanges extending from a respective one end of said strap portion, said strap portion having an annular recess in the inside surface proximate each opposed axial end thereof for cooperation with said lobe portions of said cushion member, the depth of said annular recesses being substantially less than the height of said lobe portions such that on securing said bracket to said frame over said cushion member the opposed axial ends of said cushion member are subjected to substantially greater compression than is the portion of said cushion member between said lobe portions.

2. The mounting device of claim 1 wherein said tubular cushion member has an axially straight central portion between said lobes and the portion of each said lobe terminating at the respective axial end of said cushion member being a greater distance from the axis of said cushion member than the straight central portion is from said axis, the axial terminating portion of said lobes being compressed by said strap before said central portion is contacted by said strap on securing said bracket to said frame.

* * * * *